United States Patent [19]
Argos et al.

[11] Patent Number: 4,988,847
[45] Date of Patent: Jan. 29, 1991

[54] ELECTRICALLY HEATED AIR BLOWER UNIT FOR DEFOGGING BATHROOM MIRRORS

[76] Inventors: Harry J. Argos, 2928 E. Virginia Ave., W. Covina, Calif. 91791; George Spector, 233 Broadway RM 3815, New York, N.Y. 10007

[21] Appl. No.: 902,510

[22] Filed: Sep. 2, 1986

[51] Int. Cl.⁵ .......................... H05B 1/00; E06B 7/12; F24H 3/04
[52] U.S. Cl. ........................................ 392/363; 98/36; 98/90; 165/86; 219/203; 219/219; 392/421
[58] Field of Search .................. 219/364–373, 219/374–376, 213, 219, 203, 366–368; 165/86; 98/36, 90

[56] References Cited

U.S. PATENT DOCUMENTS

| | | | |
|---|---|---|---|
| 2,310,086 | 2/1943 | Howard | 165/86 |
| 2,617,701 | 11/1952 | Fennell | 219/370 X |
| 2,795,683 | 6/1957 | Teiger | 219/376 |
| 3,086,441 | 4/1963 | London | 219/370 X |
| 3,147,368 | 9/1964 | Walker | 219/368 X |
| 3,211,077 | 10/1965 | Kramer | 219/368 X |
| 3,362,469 | 1/1968 | Bermer et al. | 219/371 X |
| 3,390,251 | 6/1968 | Lowenfish | 219/213 |
| 3,572,234 | 3/1971 | Schoenthaler | 98/36 |
| 4,037,079 | 7/1977 | Armbruster | 219/366 X |

*Primary Examiner*—Anthony Bartis

[57] ABSTRACT

A device for defogging a wall mounted bathroom mirror includes an elongated housing adjustably suspended above and outwardly of the mirror by a pair of brackets. Ambient air drawn into the housing by a fan is filtered, heated by an electric heating element and discharged through an elongated air outlet on the housing toward the mirror. The air outlet is provided with a plurality of adjustable longitudinal louvers for selectively varying the heated air flow direction. Each louver is provided with an electric heating element for further heating the discharged air.

1 Claim, 1 Drawing Sheet

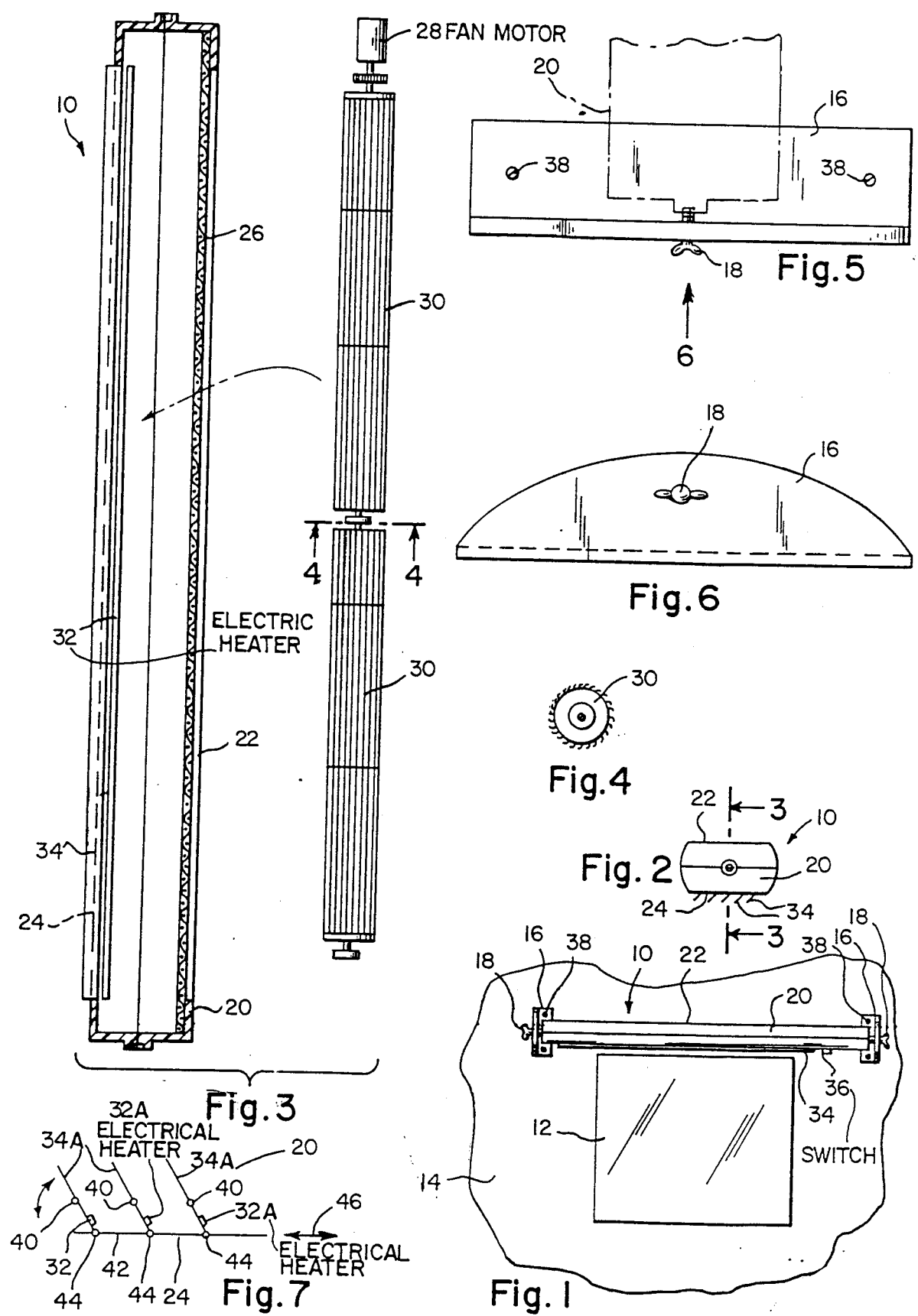

ELECTRICALLY HEATED AIR BLOWER UNIT FOR DEFOGGING BATHROOM MIRRORS

BACKGROUND OF THE INVENTION

The instant invention relates generally to heat distribution blowers and more specifically it relates to an apparatus for defogging a bathroom mirror.

Numerous heat distribution blowers have been provided in prior art that are adapted to eliminate the formation of condensation on flat glass surfaces. For example, U.S. Pat. Nos. 1,465,292; 2,617,701 and 4,037,079 all are illustrative of such prior art. While these units may be suitable for the particular purpose to which they address, they would not be as suitable for the purposes of the present invention as heretofore described.

SUMMARY OF THE INVENTION

The invention relates to a device for defogging a bathroom mirror which comprises a housing mounted above the mirror top edge having a motor operated fan contained in the housing. At the top of the housing is a full length inlet port with a filter and at the bottom of housing just above the mirror is a louvered outlet port. The fan rotates about a longitudinal axis parallel to the top of the mirror causing air to enter the housing through the inlet port and exit through the outlet port at the bottom of the housing whereby the louvers direct the air over the mirror. An electric heater rod is provided at the exit port. In a modified form the louvers are pivotable about a longitudinal axis and each louver is provided with an electric heater rod. The housing is removeably mounted on spaced end brackets.

A primary object of the present invention is to provide an apparatus for defogging a bathroom mirror that will overcome the shortcomings of the prior art devices.

Another object is to provide an apparatus for defogging a bathroom mirror that is constructed for blowing warm filtered air downwardly across the mirror to remove moisture therefrom.

An additional object is to provide an apparatus for defogging a bathroom mirror that is within a compact housing which may be quickly installed to a wall over the bathroom mirror.

A further object is to provide an apparatus for defogging a bathroom mirror that is simple and easy to use.

A still further object is to provide an apparatus for defogging a bathroom mirror that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front elevational view of a mirror on a wall with the invention installed ready to be used.

FIG. 2 is an end view of the external housing.

FIG. 3 is an exploded cross sectional view taken along line 3—3 in FIG. 2 of the housing with the motor and the squirrel fan removed therefrom.

FIG. 4 is a cross sectional view taken along line 4—4 in FIG. 3 showing the blades on the squirrel fan.

FIG. 5 is an enlarged detail view of one of the brackets.

FIG. 6 is a side view of the bracket taken in the direction of arrow 6 in FIG. 5.

FIG. 7 is a diagrammatic view of a modification showing heating elements on the louvers and a control rod to operate the louvers.

DETAILED DESCRIPTION OF THE PREFERRED EMBODIMENT

Turning now descriptively to the drawings, in which similar reference characters denote similar elements throughout the several views, FIGS. 1 through 6 illustrate an apparatus 10 for defogging a bathroom mirror 12 on a wall 14. The apparatus 10 consists of a pair of spaced apart bracket units 16 with wing bolts 18, secured tot he wall 14 adjacent and above opposite ends of upper portion of the mirror 12. An elongated housing 10 is mounted between the bracket units 16 by the wing bolts 18 and suspended outwardly from the mirror 12. The housing 20 has an upper elongated air inlet port 22 and a lower elongated air outlet port 24.

An elongated filter 26 is mounted within the housing 20 directly below the air inlet port 22 to prevent foreign objects from entering the housing. An electric motor 28 is disposed within the housing. An elongated squirrel fan 30 is rotatably mounted within the housing 20 and is operated by the motor 28 to draw ambient air into the housing through the air inlet port 22 and to discharge air from the housing through the air outlet port 24.

An elongated electrical resistance-type heating element 32 is mounted within the housing 20 directly above the air outlet port 24 to warm the air before it is discharged from the housing. A plurality of elongated louvers 34 are mounted within the air outlet port 24 of the housing 20 for directing flow of the warm air in a direction toward the mirror 12 for defogging the- mirror.

A three position control switch 36 is mounted to the housing 20 for off, high, low speed for the motor 28 and off, high, low heat setting for the heating element 32. The switch 36 is electrically connected to a suitable power source. Mounting screws 38 are provided for attaching each of the bracket units 16 to the wall 14.

A modification is shown in FIG. 7 in which additional a of heating elements 32A are each mounted to, each of the louvers 34A. The louvers are pivotly mounted at 40 to the housing 20 within the air outlet port 24 of the housing 20. An elongated control rod 42 is transversely placed and pivotly connected therealong at 44 to each forward end of the louvers 34A to manually change the angle of the louvers simultaneously by a push-pull manipulation as indicated by arrow 46.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for defogging a bathroom mirror on a wall comprising:

(a) a pair of spaced apart bracket units adapted to be secured to said wall adjacent and above opposite ends of the upper portion of a mirror, each bracket including a wing bolt;

(b) an elongated housing mounted longitudinally between said bracket units by said wing bolts and adapted to be suspended outwardly from the mirror, said housing having an upper elongated air outlet port and a lower elongated air outlet port;

(c) an elongated filter mounted within said housing directly below said air inlet port to prevent foreign objects from entering said housing;

(d) an electric motor disposed within said housing;

(e) a longitudinal squirrel and fan rotatably mounted within said housing and operated by said motor to draw ambient air into said housing through said air inlet port and to discharge air from said housing through said air outlet port;

(f) an elongated electrical resistance-type heating element mounted within said housing directly above said air outlet port to warm said air before it is discharged from said housing;

(g) a plurality of longitudinal louvers mounted within said air outlet port of said housing for directing flow of said warm air in a direction toward the mirror for defogging the mirror;

(h) a plurality of heating elements each of which is mounted to a different one of said louvers;

(i) said louvers being adjustably mounted within said air outlet port of said housing; and (j) an elongated control rod transversely placed and pivotly connected therealong to each forward end of said louvers to manually change the angle of said louvers simultaneously by a push-pull manipulation thereby providing for adjustment of the louvers in said outlet port.

* * * * *